Jan. 9, 1968     J. H. E. LOUETTE     3,362,191
ELASTIC COUPLING
Filed March 14, 1966     3 Sheets-Sheet 1
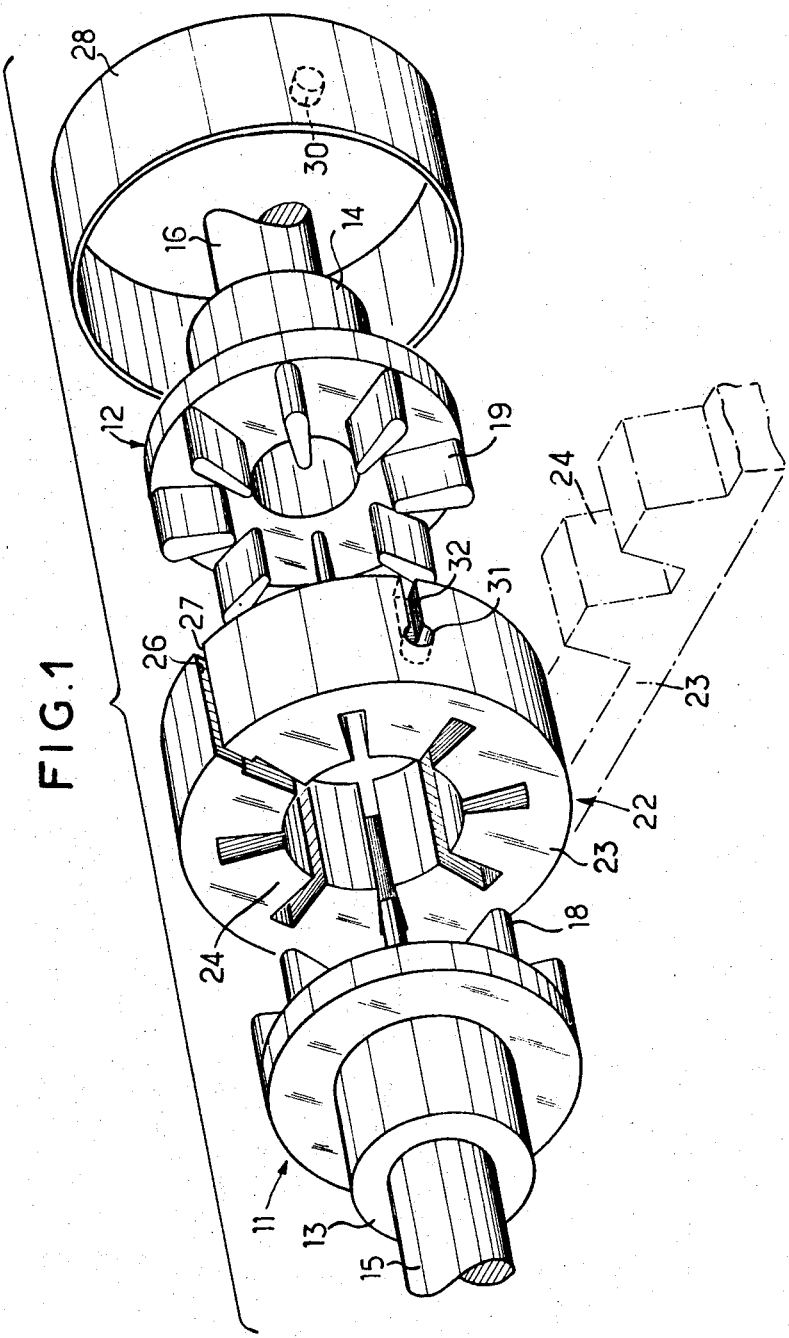
INVENTOR
JEAN HECTOR ERNEST LOUETTE
By Young & Thompson
ATTYS.

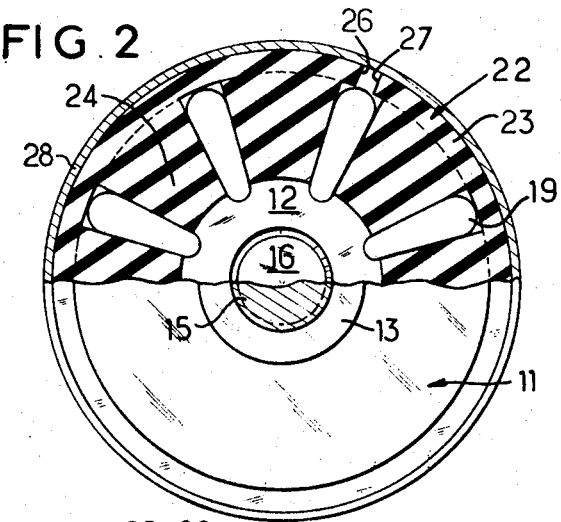
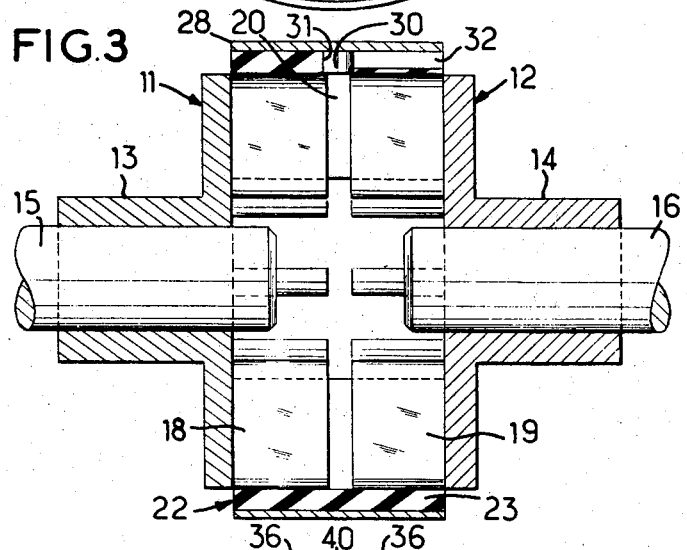
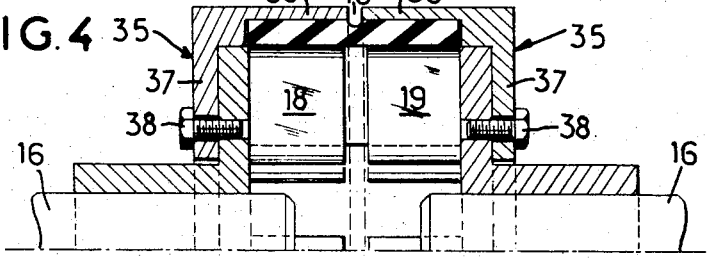

Jan. 9, 1968  J. H. E. LOUETTE  3,362,191
ELASTIC COUPLING
Filed March 14, 1966  3 Sheets-Sheet 3
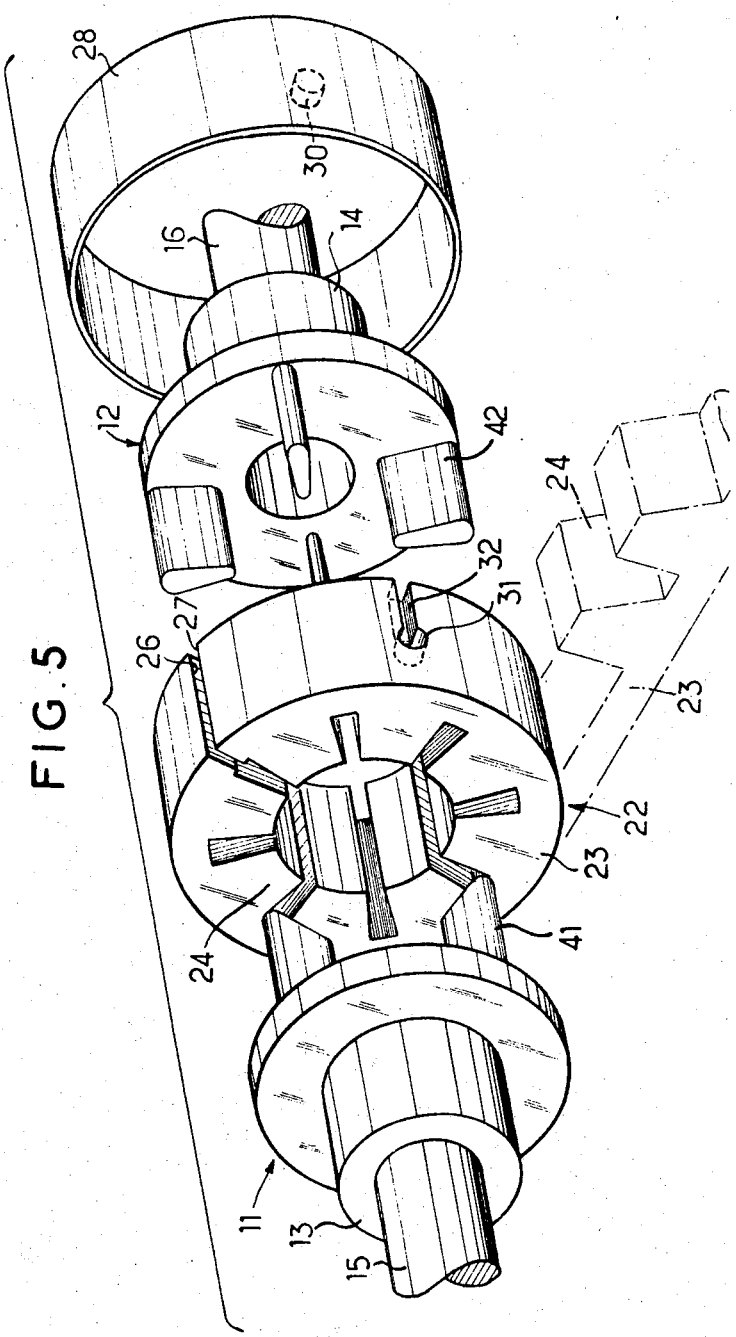
INVENTOR
JEAN HECTOR ERNEST LOUETTE
BY Young + Thompson
ATTYS.

United States Patent Office 3,362,191
Patented Jan. 9, 1968

3,362,191
ELASTIC COUPLING
Jean Hector Ernest Louette, Mennecy, France, assignor to S.A.M.I. Societe d'Applications de Moulages Industriels Societe Anonyme, Malesherbes, Loiret, France, a corporation of France
Filed Mar. 14, 1966, Ser. No. 534,143
Claims priority, application France, Mar. 16, 1965, 9,492
1 Claim. (Cl. 64—11)

ABSTRACT OF THE DISCLOSURE

A coupling system for rotating coaxial shafts having two confronting plates respectively rigid with the shafts, the facing surfaces of said plates having protrusions between which are located the tooth blocks of a cogged belt wrapped around the plates with its ends substantially in abutment. The belt is retained by a one-piece hoop surrounding the belt, the hoop having a radially inwardly extending peg which engages in a hole in the belt.

---

This invention relates to an elastic coupling system for coupling together two substantially coaxial rotating shafts or the like, of the kind wherein two facing plates are respectively rigid with the two shafts and are formed on their inner faces with protrusions between which are positioned elastic blocks which provide a resilient and elastic interconnection between said two plates and hence between said two shafts or like members, while at the same time permitting slight angular deflections of one shaft with respect to the other.

Recourse has already been had to a device of this kind in which the two plates, which are formed on their facing surfaces with equal numbers of angularly equidistant radial ribs, are coupled together by means of a cogged belt made of resilient and elastic material which is wrapped around said plates in such manner that each cog engages between a pair of ribs on each of the facing plates.

Said elastic ring comprises, integral therewith, a strong internal flexible reinforcement the ends of which may be interconnected by suitable means such as a hinge.

Such a system, however, has serious drawbacks. In the first place, since the reinforcement used to retain the ring in position is integral therewith, and hence must be opened to enable it to be fitted without shifting the plates, provision must be made for interconnecting the two ends of the reinforcement, for example by means of a hinge-like device. As is well known, such devices have comparatively poor resistance to the effects of centrifugal force since the interconnection is heavily loaded; furthermore, fracturing thereof could be dangerous since the ring would then be thrown outwards under the effect of centrifugal force. In the second place, the elastic cogs of the ring tend to escape from between the plate ribs under the effect of the driving torque, thus heavily stressing the coupling; further, wear takes place on the shaft and the hinge as a result of vibration and other movement. Thirdly, positioning the elastic ring on the plates requires a large opening in the ring, and a comparatively thin and therefore somewhat weak reinforcement is required to facilitate opening of the ring. The operation of opening the ring, on the other hand, distorts the reinforcement which, once in position and closed anew, fails to revert to a perfect circular shape, thereby introducing a degree of unbalance in rotation which is detrimental to the mechanical components.

This invention relates to a coupling of this kind which avoids the aforesaid drawbacks. In the coupling of the invention, the internally reinforced belt is replaced by a one-piece cogged belt made of elastic material, the ends of which are substantially in abutment when the belt is wrapped about the periphery of the plates and at least one binding hoop formed in one-piece surrounds said belt.

Assembly is unusually easy since the elastic belt, which has no reinforcement, can readily be wrapped around the two coupling plates. The binding hoop, which was previously passed over one of the shafts before its associated coupling plate was affixed thereto, is then engaged over the resilient belt. A coupling system obtained in this way will be free from out-of-balance forces when it is rotating.

The description which follows with reference to the accompanying non-limitative exemplary drawings will give a clear understanding of how the invention can be carried into practice.

In the drawings:

FIGURE 1 is a perspective view of a form of embodiment of the coupling according to the invention.

FIGURE 2 shows in its upper part a half cross-sectional view of said coupling, and in its lower part a half elevation view thereof.

FIGURE 3 is a diametrical sectional view of the coupling of FIGURES 1 and 2.

FIGURE 4 is a partial diametrical sectional view of an alternative form of embodiment of a coupling according to the invention; and FIGURE 5 is a perspective view of yet another possible form of embodiment of the subject coupling of the invention.

Reference is first had to FIGURES 1 to 3 for an illustration of a first possible form of embodiment of the coupling according to this invention, in which two plates 11 and 12 are respectively associated to sleeves 13 and 14 for securing said plates to the ends of the shafts 15 and 16 to be coupled together. Plates 11 and 12 have formed, on their faces remote from their coupling sleeves, sets of angularly equidistant radial ribs 18 and 19, respectively, arranged star-fashion and numbering eight on each plate in the example illustrated in the drawings. On assembly, the two plates are positioned facing each other in such manner that the ribs 18 and 19 register with one another, an interval 20 being provided therebetween (see FIG. 3).

The elastic coupling member is a cogged belt 22 made of a resilient elastic material such as rubber or plastic and consists of a backing strip 23 serving as a support for eight cogs 24 formed integrally therewith, each cog being contoured to match the space between any two consecutive ribs on a plate.

With the plates positioned as hereinbefore specified, the belt 22, the width of which is equal to the gap between the plates in their ultimate coupled position, is wrapped about the periphery of said plates so that each cog 24 lodges between a pair of ribs on each of the two plates and is thus clamped radially between the ribs and axially between the faces of the plates. The two belt ends 26 and 27 are then adjacent each other.

The subject coupling of the invention further includes a one-piece binding hoop 28 consisting for instance of a metal tube section which is threaded over one of the shafts prior to assembly. Hoop 28 has an inner diameter equal to the outer diameter of the cogged belt wrapped about the plates, and is engaged over said belt whereby to secure the same in position. Said hoop enables the belt to withstand centrifugal force as well as the effect of the driving torque which causes the cogs 24 to tend to recede from the rotation axis due to their tapering form. Although belt 22 is subjected to heavy loads, it is devoid of any joints liable to fail under such loads, thereby ensuring great reliability. The belt is furthermore devoid of an internal reinforcement and can therefore readily be wrapped about the plates or unwrapped therefrom, thus greatly facilitating the operation of fitting it to the coupling plates.

In the specific form of embodiment illustrated for exemplary purposes, binding hoop 28 has formed on its inner face at least one peg 30 which is directed towards the centre of the hoop and is secured to the latter by welding or any other convenient method, or which is stamped thereon, and the outer face of belt 22 has formed therein a hole 31 the diameter of which is equal to the diameter of peg 30 and which is extended to one edge of the belt by a groove 32 of width somewhat less than the diameter of hole 31. When positioning the binding hoop 28, peg 30 is engaged into groove 32, this being feasible due to the elasticity of the belt material. The hoop is then shifted axially until peg 30 penetrates into hole 31, and this time the elasticity of the material prevents the hoop from moving back. Manifestly, binding hoop 28 may be formed with a plurality of pegs similar to peg 30.

Reference is next had to the form of embodiment shown in FIGURE 4, in which the cogged belt is restrained on the coupling plates by means of two circular angle-iron shaped binding hoops 35, the flanges 36 of which form binding hoops extending in each case over somewhat less than half the width of belt 22, and the other flanges 37 of which are pressed respectively against the outer faces of the coupling plates and are fixed thereto by any convenient means such as screws 38 uniformly spaced over the perimeter of the coupling plates. A gap 40 is left between the two binding hoops 36.

Reference is lastly had to FIGURE 5 for a perspective view of yet another constructional form for the subject coupling of this invention, the component parts of which are similar to those of the coupling in FIGURE 1, like parts being designated by like reference numerals. In the embodiment of FIGURE 5, however, each of plates 11 and 12 is formed with only half as many radial ribs (four ribs 41 for plate 11 and four ribs 42 for plate 12), and these ribs are longer than in the embodiment shown in FIGURE 1, their length being only slightly less than the width of belt 22 which, as before, is formed with eight cogs 24. When assembling the coupling, the plates are positioned so that each rib on one of the plates locates between two ribs on the other plate, and belt 22 is wrapped about the two plates in such manner that each belt cog 24 lodges between one of the ribs 41 and one of the ribs 42, whereby each interval between successive cogs receives only one rib in this case. In this constructional form, the cogs 24 work in compression, whereas in the embodiment of FIGURE 1 they worked in shear.

What I claim is:

1. An elastic coupling between two rotating shafts or the like, comprising two confronting plates respectively rigid with said two shafts and having formed on the facing surfaces thereof equal numbers of radial ribs, a cogged belt wrapped around the periphery of said two plates in such manner that each cog engages between ribs on said plates, said belt and said cogs being formed in one piece of an elastic material and the ends of said belt being substantially in mutual abutment, and at least one one-piece continuous binding hoop surrounding said belt, said binding hoop having on its inner face at least one peg extending radially toward the center of the hoop, said elastic belt having on its outer face a hole for each peg, said holes having a diameter equal to that of said pegs and being extended to one edge of said belt by a groove of a width slightly less than the peg diameter.

References Cited

UNITED STATES PATENTS

| | | | |
|---|---|---|---|
| 1,160,462 | 11/1915 | Taylor | 64—11 |
| 2,655,798 | 10/1953 | Neher | 64—14 |
| 2,924,082 | 2/1960 | Reich | 64—13 |
| 2,996,900 | 8/1961 | Fermier | 64—14 |

FOREIGN PATENTS

| | | |
|---|---|---|
| 839,967 | 4/1939 | France. |
| 1,211,675 | 3/1960 | France. |

HALL C. COE, *Primary Examiner.*